Patented Jan. 17, 1939

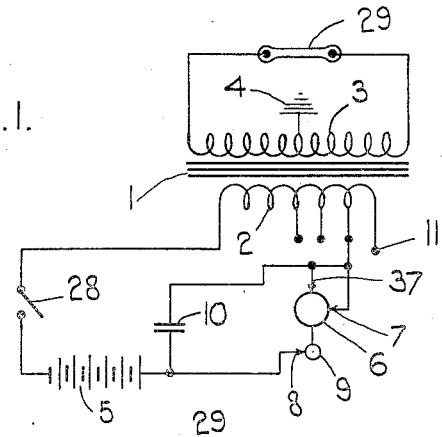
FIG. 1.
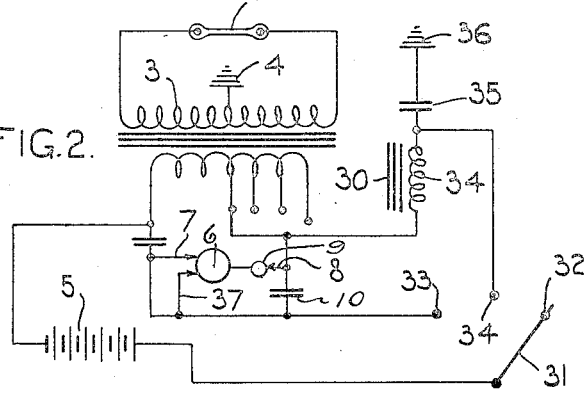
FIG. 2.
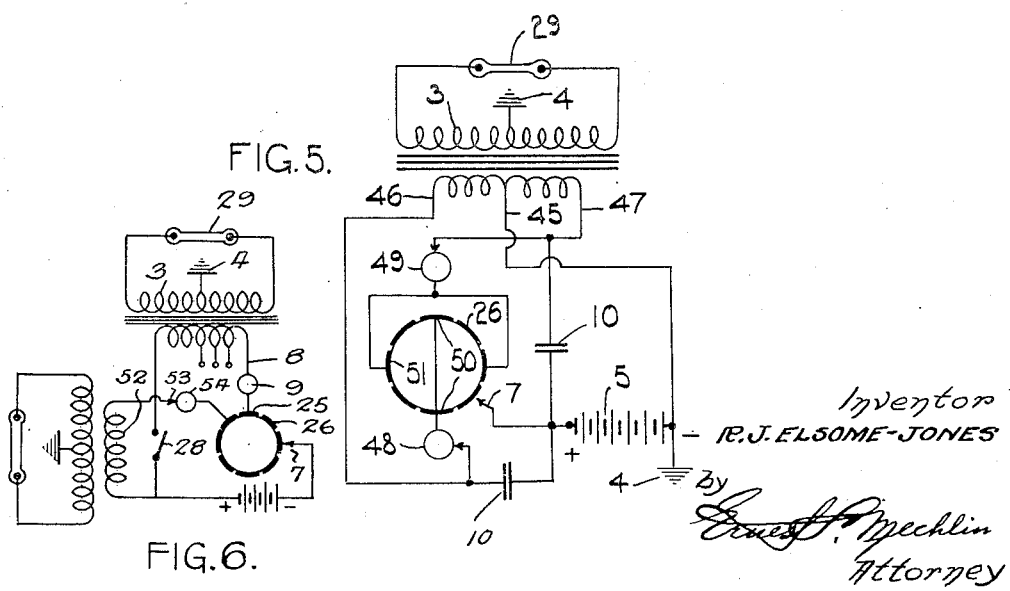
FIG. 5.
FIG. 6.
Inventor
R. J. ELSOME-JONES
by
Ernest F. Mechlin
Attorney

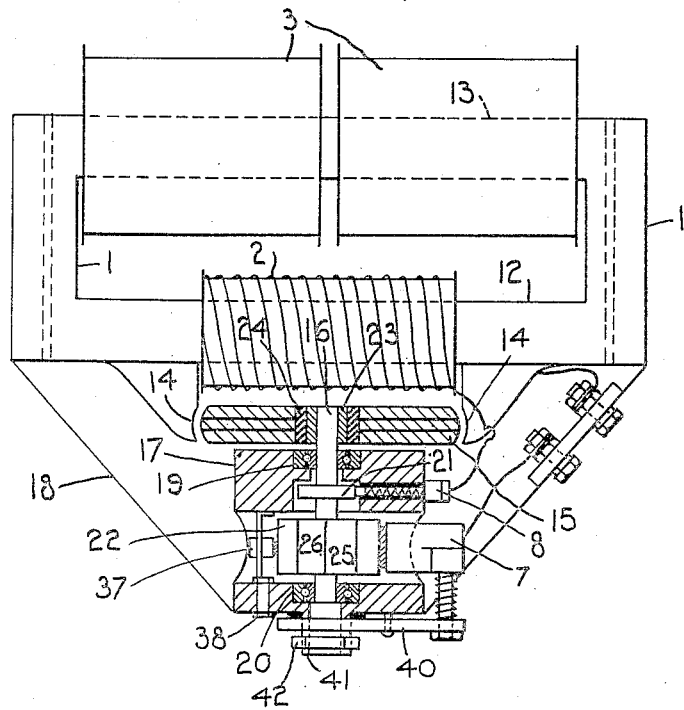
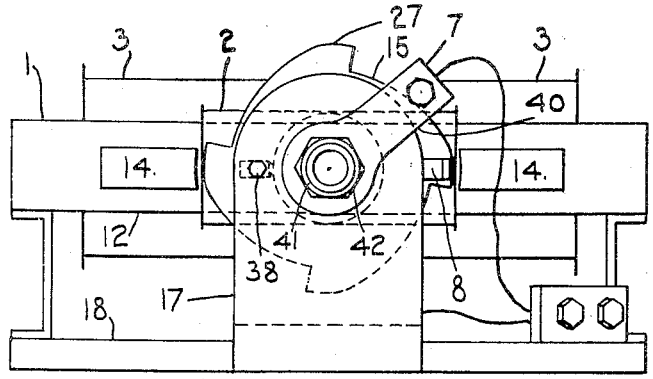

2,144,593

UNITED STATES PATENT OFFICE 2,144,593

APPARATUS FOR OBTAINING HIGH-TENSION ALTERNATING CURRENT FROM LOW-TENSION DIRECT CURRENT

Ronald Job Elsome-Jones, Mill Hill, London, England, assignor to Technical Inventions Limited, London, England Application February 23, 1937, Serial No. 127,248
In Great Britain February 26, 1936

5 Claims. (Cl. 175—364)

This invention relates to apparatus for obtaining high tension alternating current from low tension direct current and has more especial reference to apparatus suitable more particularly for use on motor vehicles to supply high tension current for radio receivers, or, it may be, for neon or similar illuminated signs.

Hitherto, apparatus for producing high tension alternating current to operate illuminated signs, radio instruments and the like on motor vehicles has been of a complicated and expensive nature requiring expert attention and maintenance or in some cases interrupted D. C. has been produced from the vehicle's electric installation by magnetic vibration or magnetic make and break.

The present invention has for its object to provide simply and cheaply constructed apparatus furnishing a uniform and consistent supply of high tension current with a minimum of care and attention.

Further and favourable objects will appear from the following description.

Broadly stated, apparatus for producing high tension current according to the invention includes a step-up transformer with the primary of which a circuit interrupter advantageously a repulsion motor, is combined, the transformer primary serving the dual purpose of operating the motor and also of inducing high tension current in the secondary circuit.

Conveniently the shaft of the electric motor carries a commutator or other appropriate form of interrupter wired in the circuit of the primary so that on the latter being connected to a source of direct current, e. g. an accumulator, the apparatus functions as a booster furnishing high potential interrupted or pseudo-alternating current in the secondary circuit.

Normally the motor will start immediately the primary circuit is closed although to ensure self-starting of the apparatus under all conditions of use there is preferably associated with the starting switch an auxiliary momentarily operable magnetic impulse starter for the rotor, the winding of which starter may advantageously also serve as a smoothing choke.

For motor vehicles equipped as customary with a lighting circuit including a storage battery or accumulator, say of 12 volts, and in conjunction therewith an engine-driven generator, the motor combined with the transformer operates a positive circuit breaker or interrupter in the circuit of the transformer primary, which converts sufficient direct current supplied by the battery into pseudo-alternating current capable of transformation to the high tension requisite and of the necessary wattage, say from 3,000 to 10,000 volts in the case of a neon sign, or 300 volts in the case of a radio instrument.

In one embodiment of combined transformer and motor-driven circuit interrupter according to the invention, a laminated core, made up of rectangular Stalloy frame units, carries a secondary winding around the stacked top limbs of the frame.

The primary winding—it may be in two parts—is wound around the bottom limb of the frame from which project pole pieces, the rotor being supported for rotation between said pole pieces and being suitably borne on anti-friction bearings.

On the rotor shaft between its supporting bearings is a slip ring and commutator with which co-operate brushes, one adapted for connection to the primary winding and the other bearing on the commutator and adapted for connection to the motor vehicle battery or accumulator to complete the primary circuit.

Alternate commutator segments are connected to the slip ring, intermediate segments being dead, the number and disposition of live segments corresponding with the number and disposition of the poles on the rotor.

Reference will now be had to the accompanying drawings where the invention is illustrated by way of example and wherein Fig. 1 is a circuit diagram of a simple form of the apparatus, Fig. 2 is a similar circuit diagram of apparatus furnished also with positive self-starting equipment. Figs. 3 and 4 are respectively a plan and elevation of a practical embodiment of the apparatus diagrammatically represented in Fig. 1, while Fig. 5 is a circuit diagram similar to Fig. 1 of apparatus suitable for the production of full wave alternating current. Fig. 6 is a circuit diagram showing a development of the arrangement illustrated in Fig. 1 adapted for the operation of a second transformer from the same source of direct current supply.

Referring now to the drawings but first more particularly to Fig. 1, the transformer core of laminated iron, Stalloy or other customary material is generally designated 1.

2 indicates the primary winding and 3 the secondary winding which is shown centre tapped to earth at 4.

5 indicates the motor vehicle battery or other source of supply and 6 generally designates the interrupter included in the circuit of the primary winding 2 and having an interrupter brush 7 bearing on the commutator of the interrupter 6, a pick-up brush 8 bearing on a slip ring 9 of the motor shaft as hereafter described.

10 indicates a smoothing condenser shunted across the primary winding 2 and its circuit interrupter while 11 are alternative tappings on the primary winding to suit the apparatus to different voltage outputs.

Referring now more particularly to Figs. 3 and 4 where like reference numerals denote like or equivalent parts, the laminated core 1 of the apparatus is composed of closed rectangular frame type units stacked together around one major limb 12 of which is wound the primary 2, the opposite limb 13 carrying the secondary winding 3 in two parts.

Projecting from the limb 12 are pole pieces 14 for the rotor 15, such pole pieces being conveniently formed integrally with the central laminations or units making up the core.

The rotor 15 is carried by a spindle 16 suitably borne in a pedestal 17, of brass or other non-magnetic material, mounted on a base plate 18 of similar material, anti-friction ball bearings 19 and 20 being shown, although plain or other bearings may be utilized.

Between the bearings 19 and 20 the spindle 16 carries a slip ring 21 which is associated the pick-up brush 8 of conventional form and adjacent the slip ring 21 is a commutator 22 upon which bears the main interrupter brush 7, all of which are insulated from the spindle and pedestal.

The rotor 15 is shown electrically insulated from the spindle 16 by a sleeve 23 of ebonite or the like and magnetically insulated therefrom by a brass bush 24 and the commutator 22 is correspondingly insulated from the spindle 16.

On the primary circuit being closed by an appropriate switch 28 current from the battery 5 passes through the primary winding 2—which also serves as the field winding of the poles 14 of the rotor 15—whereat the latter commences to rotate taking with it the commutator 22 which successively makes and breaks the circuit, it being understood that alternate segments 25 of such commutator are electrically connected with the slip ring 21, while intermediate segments 26 of such commutator are dead segments isolated by insulation.

With the secondary circuit appropriately completed, for instance by the inclusion of a neon or like sign 29 (see Fig. 1), high tension current is induced in such circuit, the core 1 providing a closed path for the inducing flux and only a very small part of the main flux being used at the motor poles 14 owing to the absence of torque on the spindle so that a secondary output of the utmost efficiency is obtained.

The number of live segments 25 corresponds with the number of poles 27 on the rotor 15 as does the disposition of such segments, the arrangement being such that the interrupter brush 7 reaches a dead segment to break the circuit just before the rotor poles 27 and the field poles 14 coincide, there being four poles and four live segments in this embodiment, although as will be appreciated the number may be varied according to the character of the supply and of the secondary output desired.

The frequency of the output current can be readily regulated by adjusting the speed of the rotor, for instance by interposing appropriate resistance in its circuit.

Providing the brush 7 is in contact with a live segment 25, the rotor 15 will commence to revolve immediately the primary circuit is completed by its switch, although to ensure self-starting of the apparatus under all conditions of use, resort may conveniently be had to the magnetic impulse starter diagrammatically represented in Fig. 2 at 30 and carried by one of the poles 14.

Referring now more particularly to Fig. 2, 31 represents the moving contact of a starting switch, 32 the "off" contact and 33 the "on" contact closing the primary circuit, while 34 is an intermediate starting contact brushed by the arm 31 during its movement to operative position and energizing the winding 34 of the aforementioned starter magnet 30 which thereupon co-acts with the adjacent pole 27 of the rotor 15 to bring the shaft 16 to a position in which the brush 7 is bearing on a live segment 25. Consequently on the arm 31 of the switch reaching the contact 33 the primary circuit is closed and the apparatus immediately operates inducing a high-potential interrupted or pseudo-alternating current in the secondary circuit.

In Fig. 2 it will be noted that the coil 34 of the starting magnet 30 connects the primary through a condenser 35 to earth at 36 whereby it functions during the normal operation of the apparatus as a peak volt choke.

There is also shown for the more effective control of the apparatus a small high resistance control brush 37 which is connected in parallel with the interrupter brush 7 but is independent thereof as regards setting.

Reverting now again to Figs. 3 and 4, the interrupter brush 7 is adjustable being carried on an arm 40 pivoted to a bush 41 projecting from the end face of the pedestal 17, adjustment being permitted by slackening a nut 42, which on being tightened, fixes the adjusted position of the brush 7 which latter is spring pressed into engagement with the commutator 22 as customary to take up wear. The control brush 37 is independently adjustable by means of its crank arm mounting 38.

Where an output more nearly corresponding with alternating current is required the arrangement diagrammatically illustrated in Fig. 5 may be utilized. In this figure the primary winding 2 is centre tapped at 45, the centre tapping being connected to one pole of the battery or accumulator. The respective ends 46 and 47 of the primary winding are connected to slip rings 48 and 49, the slip ring 48 being in turn connected to diametrically opposite segments 50 on the commutator 6 and the slip ring 49 being similarly connected to the opposite pair of segments 51, the segments 26 intermediate the live segments 50 and 51 being insulated as in the previous embodiments.

The interrupter brush 7 bearing on the commutator is connected to the other pole of the battery 5 and in operation the primary circuit is alternately completed through the left hand half between the centre tapping 45 and the end 46— and through the right hand half—between the centre tapping 45 and the end 47, a secondary output closely resembling full wave alternating current being thereby obtained.

It will be understood that the practical embodiment illustrated in Figs. 3 and 4 is shown by way of example only and that in place of the rectangular frame section core any appropriate form of core providing a closed path for the inducing flux may be utilized, e. g. one composed of interleaved F section laminations, the rotor being disposed between pole pieces formed at or adjacent the bases of the F section units. Referring now to the embodiment illustrated in Fig. 6, the combined transformer and interrupter circuit is similar to that illustrated in Fig. 1, a commutator 6 being interposed in the circuit of the transformer primary 2 and having an interrupter brush 7. In this developed arrangement, however, the commutator 6 and interrupter brush 7 are included also in the circuit of a second and independent transformer, the primary 52 of which is connected on the one hand to one pole of the battery 5 and on the other through a brush 53 bearing on a slip ring 54 fixed for rotation with the rotor shaft and in electrical connection with intermediate segments 26 of the commutator, alternate segments 25 thereof being connected to the slip ring 9 as in the previous embodiments. Alternatively, the second transformer with its brush 53, slip ring 54 and intermediate segments 26 may be wired in the circuit of an independent source of supply.

In this way one combined transformer and interrupter assembly, such for instance as is illustrated in Figs. 3 and 4, may serve the additional purpose of interrupting the primary circuit of an entirely independent transformer, thus to obtain from such independent transformer high tension alternating current from a common or different source of direct current supply.

Finally, the secondary output may be taken through a supplementary commutator on the rotor shaft 18 where a high voltage rectified current is required.

What I claim is:—

1. Apparatus for obtaining high tension current from low tension direct current comprising a closed transformer core, primary and secondary windings on the closed portion of said core, pole pieces integral with and projecting from said core, a rotor having poles co-acting with said pole pieces and a commutator for breaking the circuit of said primary winding having a number of live segments equal to the number of poles on the rotor and disposed in set angular relation to such rotor poles with intermediate dead segments.

2. Apparatus for obtaining high tension current from low tension direct current according to claim 1 including a starting switch and a magnetic impulse starter for said rotor momentarily energized during closure of the said starting switch to initiate rotation of the rotor.

3. Apparatus for obtaining high tension current from low tension direct current according to claim 1 including a starting switch and a magnetic impulse starter for said rotor momentarily operated during closing of the starting switch having a coil for the impulse starter magnet normally earthing the primary winding of the transformer through a condenser and thus serving as a peak volt choke.

4. Apparatus for obtaining high tension current from low tension direct current according to claim 1 having an interrupter brush bearing on the commutator and including a high resistance control brush associated with said interrupter brush, but adjustable on the commutator independently thereof.

5. Apparatus for obtaining from a source of direct current, alternating current of different voltage comprising a transformer with primary and secondary windings on a closed core having integral projecting pole pieces, a rotor with poles co-acting with such pole pieces, a commutator having a number of live segments equal to said poles and disposed in set angular relation with said poles and with intermediate dead segments, and a brush cooperating with said commutator to interrupt the circuit of said primary winding for transformation of the input.

RONALD J. ELSOME-JONES.